United States Patent Office.

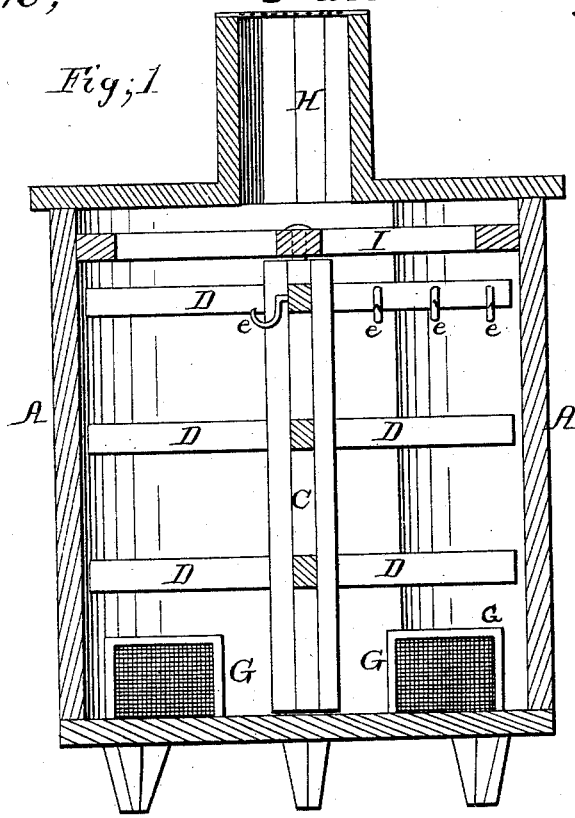
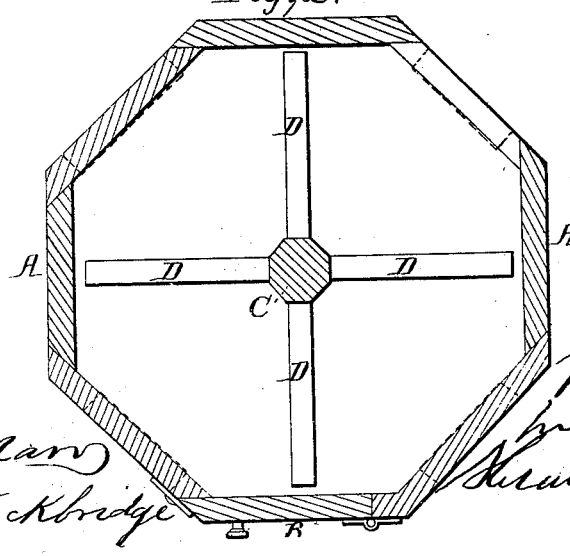

WILLIAM BRIGHTON, OF ARCANUM, ASSIGNOR TO HIMSELF AND NOAH H. TILMAN, OF DARKE COUNTY, OHIO.

Letters Patent No. 67,712, dated August 13, 1867.

IMPROVED MEAT-SAFE.

*The Schedule referred to in these Letters Patent and making part of the same.*

TO ALL WHOM IT MAY CONCERN:

Be it known that I, WILLIAM BRIGHTON, (assignor to myself and Noah H. Tilman,) of Arcanum, in the county of Darke, and in the State of Ohio, have invented certain new and useful improvements in Meat-Safes; and do hereby declare that the following is a full, clear, and exact description thereof, reference being had to the accompanying drawings and to the letters of reference marked thereon.

In the annexed drawings, making part of this specification, A represents a meat-safe, of any suitable material, and in any desirable shape, though I prefer it made octagonal, as here represented. This safe is provided with a suitable door, B, with ventilating openings G G, covered with gauze wire or cloth, which are situated near its bottom; and it is also provided with a chimney or flue, H, which is covered likewise with gauze wire or cloth. C represents an upright shaft or post, which passes up through the safe from the centre of its bottom, having a bearing at top in a cross-piece, I, and also one in the bottom of the safe. This shaft C is provided with a series of arms, which project out from it at right angles in four directions. These arms are provided with hooks for hanging meat upon, the said arms and hooks being so distributed that meat can be hung on them in such a manner as to equalize or distribute the weight upon the shaft C, to keep it from binding, and to allow it to revolve freely.

The shaft C revolves readily in its bearings, and the operator, standing at the door of the safe, may hang meat upon any of the hooks of the arms, or may remove it from them, revolving the shaft to suit his purposes.

By this arrangement a safe of great capacity may be formed, into which meats or other material may be placed, or may be removed from, without the operator entering it.

Having thus fully described my invention, what I claim as new, and desire to secure by Letters Patent, is—

The vertical revolving shaft, with two or more series of horizontal arms D D, when said arms are provided with hooks $e$ $e$, the whole being arranged within the case A in the manner specified.

In testimony that I claim the foregoing I have hereunto set my hand and seal this 29th day of April, 1867.

WILLIAM BRIGHTON. [L. S.]

Witnesses:
  IRVIN MOTE,
  M. BITTER.